(12) United States Patent
Bell

(10) Patent No.: US 10,330,429 B1
(45) Date of Patent: Jun. 25, 2019

(54) BOWSTRING SAW

(71) Applicant: James Bell, Oklahoma City, OK (US)

(72) Inventor: James Bell, Oklahoma City, OK (US)

( * ) Notice: Subject to any disclaimer, the term of this patent is extended or adjusted under 35 U.S.C. 154(b) by 0 days.

(21) Appl. No.: 15/998,263

(22) Filed: Jul. 25, 2018

Related U.S. Application Data

(60) Provisional application No. 62/761,320, filed on Mar. 16, 2018.

(51) Int. Cl.
  *F41B 5/14* (2006.01)
  *B23D 51/00* (2006.01)
  *F41B 5/00* (2006.01)

(52) U.S. Cl.
  CPC ............ *F41B 5/1484* (2013.01); *B23D 51/00* (2013.01); *F41B 5/00* (2013.01); *F41B 5/1411* (2013.01)

(58) Field of Classification Search
  CPC ...... F41B 5/00; F41B 5/10; F41B 5/14; F41B 5/1411; F41B 5/1449; F41B 5/1484; B27B 21/00; B26B 11/00; B23D 51/00
  USPC ...... 124/23.1, 25.6, 86, 90, 1; 30/507, 166.3
  See application file for complete search history.

(56) References Cited

U.S. PATENT DOCUMENTS

| | | | | |
|---|---|---|---|---|
| 2,941,558 A | * | 6/1960 | Dreier | B23D 51/125 30/510 |
| 3,173,461 A | * | 3/1965 | Johnson | B23D 51/125 30/510 |
| 3,207,145 A | * | 9/1965 | Browning | F41B 5/1449 124/23.1 |
| 3,253,587 A | * | 5/1966 | Pearson | F41B 5/1449 124/23.1 |
| 3,486,495 A | * | 12/1969 | Allen | F41B 5/10 124/25.6 |
| 3,802,411 A | * | 4/1974 | Manspeaker | F41B 5/0005 124/90 |
| 3,854,467 A | * | 12/1974 | Hofmeister | F41B 5/10 124/25.6 |
| 3,967,609 A | * | 7/1976 | Frydenlund | F41B 5/10 124/25.6 |
| 4,002,236 A | * | 1/1977 | Tolleson | A45C 11/24 124/25 |
| 4,050,137 A | * | 9/1977 | Carlson | F41B 5/00 124/25.6 |
| 4,074,409 A | * | 2/1978 | Smith | F41B 5/1449 124/23.1 |
| 4,077,385 A | * | 3/1978 | Fredrickson | F41B 5/10 124/25.6 |
| 4,169,455 A | | 10/1979 | Wilson | |
| 4,195,397 A | * | 4/1980 | Saunders | F41B 5/1449 124/23.1 |
| 4,202,316 A | * | 5/1980 | Barna | F41B 5/10 124/25.6 |
| 4,291,452 A | * | 9/1981 | Whitman, Sr. | F41B 5/1449 124/23.1 |
| 4,353,346 A | * | 10/1982 | Barna | F41B 5/10 124/23.1 |
| 4,499,936 A | * | 2/1985 | Nilsson | B23D 51/03 30/512 |
| 4,656,747 A | | 4/1987 | Troncoso | |

(Continued)

*Primary Examiner* — Alexander R Niconovich
(74) *Attorney, Agent, or Firm* — Randal Homburg

(57) ABSTRACT

A bowstring which is attached to a recurve or other long bow providing a section having an abrasive circular margin used to cut wood or other substance in an emergency replacing the bowstring of the bow utilized for shooting an arrow.

7 Claims, 4 Drawing Sheets

(56) References Cited

U.S. PATENT DOCUMENTS

| | | | | | |
|---|---|---|---|---|---|
| 4,846,142 | A | * | 7/1989 | Tone | F41B 5/1449 |
| | | | | | 124/90 |
| 4,907,567 | A | * | 3/1990 | Henrich | F41B 5/1426 |
| | | | | | 124/23.1 |
| 5,125,389 | A | * | 6/1992 | Paff | F41B 5/1449 |
| | | | | | 124/23.1 |
| 5,425,350 | A | * | 6/1995 | Egusquiza | F41B 5/1449 |
| | | | | | 124/1 |
| 5,509,206 | A | * | 4/1996 | Rowe | B23D 53/005 |
| | | | | | 30/380 |
| 5,746,192 | A | * | 5/1998 | Gissel | F41B 5/14 |
| | | | | | 124/1 |
| 5,957,120 | A | * | 9/1999 | Wiseby | F41B 5/14 |
| | | | | | 124/86 |
| 6,079,109 | A | * | 6/2000 | Ranieri | B23D 51/125 |
| | | | | | 30/513 |
| 6,457,244 | B1 | * | 10/2002 | Huang | B23D 51/12 |
| | | | | | 30/513 |
| 6,957,647 | B2 | * | 10/2005 | Evans | F41B 5/1449 |
| | | | | | 124/1 |
| 7,210,234 | B2 | * | 5/2007 | Chen | B27B 21/02 |
| | | | | | 30/513 |
| 7,913,680 | B2 | * | 3/2011 | Evans | F41B 5/1449 |
| | | | | | 124/1 |
| 7,980,235 | B1 | * | 7/2011 | Kronengold | F41B 5/14 |
| | | | | | 124/1 |
| 8,162,784 | B1 | * | 4/2012 | Bellefeuille | F42B 6/08 |
| | | | | | 124/20.3 |
| 9,726,452 | B1 | * | 8/2017 | Pequeno-Gimenez | |
| | | | | | B26B 23/00 |
| 2007/0226914 | A1 | * | 10/2007 | Satayana | B26B 11/001 |
| | | | | | 7/158 |
| 2017/0291236 | A1 | * | 10/2017 | Lindeman | B23D 51/03 |

* cited by examiner

BOWSTRING SAW

CROSS-REFERENCE TO RELATED APPLICATIONS

Applicant claims the benefit of Provisional Patent Application No. 62/761,320 filed Mar. 16, 2018 by the same Inventor.

I. BACKGROUND OF INVENTION

1. Field of the Invention

A bowstring which is attached to a recurve or other long bow providing a section having an abrasive circular margin used to cut wood or other substance in an emergency replacing the bowstring of the bow utilized for shooting an arrow.

2. Description of Prior Art

A preliminary review of prior art patents was conducted by the applicant which reveal prior art patents in a similar field or having similar use. However, the prior art inventions do not disclose the same or similar elements as the present bowstring saw, nor do they present the material components in a manner contemplated or anticipated in the prior art. No prior art was found within the filed of art.

II. SUMMARY OF THE INVENTION

Bow hunters commonly hunt in heavily wooded areas outside the amenities of modern convenience. They usually pack into the hunting area keeping their gear to a minimum, especially where they are optimistic that they will bag their prey and have to remove the prey from the hunting area. Therefore, every bit of material they carry must serve a purpose.

These hunter often hunt from tree stands or other hidden areas in order to gain an advantage over their prey. Sometimes having a saw is desired to remove small branches or cut wood for fires, especially where the hunting is conducted while camping. However, carrying a saw is an additional amount of gear that could be left behind if there were some other compact means to provide a saw with the other gear. The present bowstring saw accomplished that by simply providing a bowstring with the ability to saw wood, using the same bow as is used for hunting. The bowstring may also be designed and provided to cut bone and flesh for field dressing and to cut a large game carcass, such as elk, bear, deer and other legal game into manageable portions for carrying out of the field.

The preferred type bow which would be configured for the application of the bowstring saw would be a longbow or a recurve bow, as opposed to a compound bow. The bow itself would be flexible while the bowstring saw would be rigid and non-stretchable, relying upon the tension applied by the bow to maintain the bowstring which is maintained by its conforming length and at the appropriate tension. The bowstring saw can be carried as an accessory string in the pocket of the hunter or small round protective case and would only be used when a saw is required. It is as easily strung and removed as the ordinary bowstring used for hunting, yet is held taut by the force applied by the bow upon which it is strung.

III. DESCRIPTION OF THE DRAWINGS

The following drawings are informal drawings submitted with this provisional patent application.

IV. DESCRIPTION OF THE PREFERRED EMBODIMENT

Figure 1:
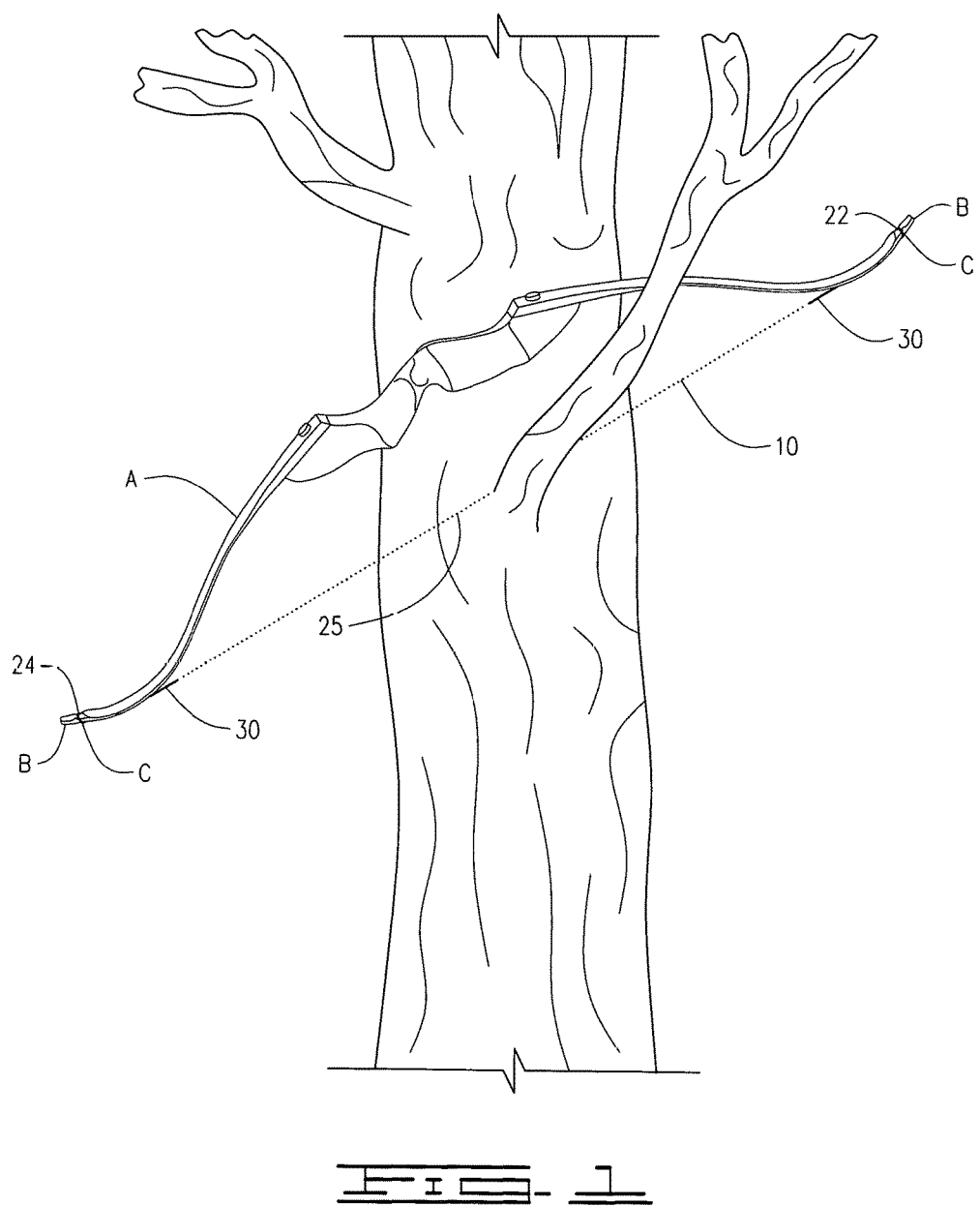
FIG. 1 is a view of the bowstring sawing through a branch on a tree to clear the tree for a tree stand hunter.
Figure 2:
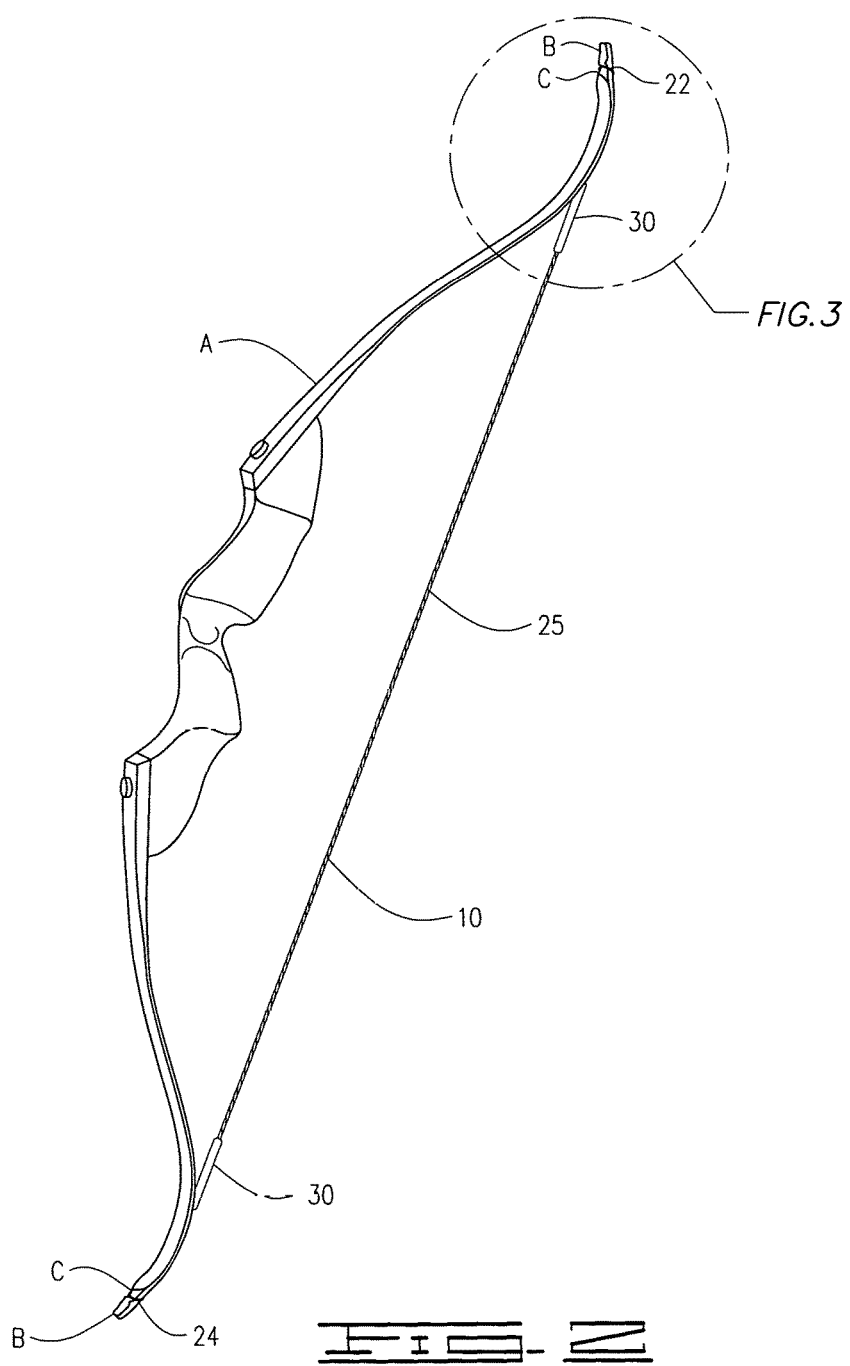
FIG. 2 is a profile view of the bowstring saw with an expanded loop end to protect the nock of the bow from damage during use of the bowstring saw.
Figure 3:
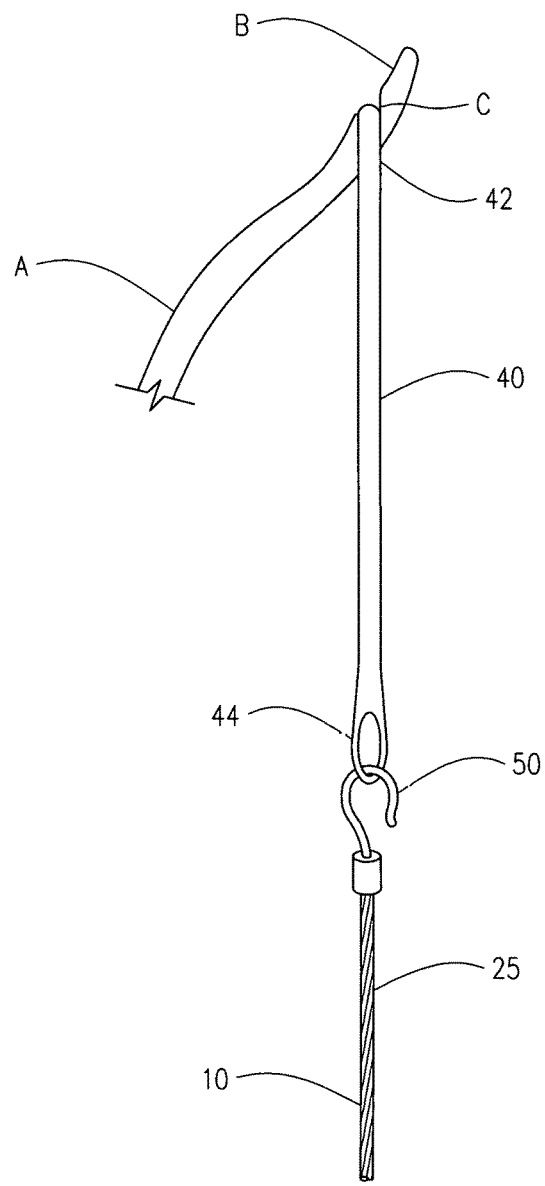
FIG. 3 is an isolated view of the cutting portion as shown in FIG. 2 in a second embodiment showing the loop attachment endpiece with the first end attached to the nock of the bow and the second end attached to a first end of the bowstring saw by a first hook, with phantom lines indicating the bowstring protective sleeve applied to the endpiece between the first and second ends.

A modified bowstring saw 10 for a hunting bow A, as shown in FIGS. 1-6 of the drawing figures, replaces the bowstring used to compel an arrow, used to cut wood, trim branches, saw through bone and flesh of large game, primarily provided for hunters in need of a temporary saw apparatus. The modified bowstring saw 10 attaches to the bow A upon the nocks C of the bow A in the same manner as the hunting bowstring used to compel an arrow without modifying the bow A. This modified bowstring saw 10 is preferably attached to either a longbow or a recurve bow A, as shown in FIGS. 1-3.

The modified bowstring saw 10 provides a string or cable 20 defining an upper end loop 22 and a lower end loop 24 configured to the same length as the bowstring used for hunting, with the upper and lower end loops 22, 24, attaching to the nocks C at each respective end B of the bow A. While the bow A itself would be flexible by design and utility, the modified bowstring saw 10 would be rigid and non-stretchable, relying upon the tension applied by the bow A to maintain the bowstring saw 10 taut, maintained by its conforming length in the same manner as the bowstring used to compel the arrow and which is being replaced by the modified bowstring saw 10.

Between the upper and lower loops 22, 24, is a cutting portion 25 that cuts wood, bone flesh and composite materials in the same manner as a traditional saw, depending upon the adapted cutting elements. The modified bowstring saw 10 is compact and may be coiled during storage and kept in a location as small as a pocket or a small container that attaches to a belt or is located as part of a quiver or other auxiliary hunting accessory. The modified bowstring saw 10 of FIG. 1 demonstrates the modified bowstring saw 10 and the bow A cutting a tree limb of a tree.

To enhance the modified bowstring saw 10 and to avoid damage to the bow A, especially at the ends B of the bow A and at each nock C where the upper and lower end loops 22, 24, attach, a bowstring protective sleeve 30 may be provided, FIGS. 1-3, preventing the cutting action from involving the bow ends B and the upper and lower loops 22, 24, which would damage the bow A and the upper or lower loops 22, 24. In addition, the bowstring saw 10 may include a loop attachment endpiece 40 between the bowstring saw 10 and the bow A, integrating with the bowstring protective sleeve 30, FIG. 3, with a first end loop 42 attached to the nock C of the bow A and a second end loop 44 attached to a respective end loop 22, 24, of the bowstring saw 10 by a hook 50, with phantom lines indicating the bowstring protective sleeve 30 applied to the loop attachment endpiece 40 between the first and second ends 42, 44. The variety of supplied blades indicated in the subsequent embodiments of the bowstring saw 10 can be exchanged while the loop attaching endpieces 40 remain attached to their respective ends B of the bow A.

Figure 6:
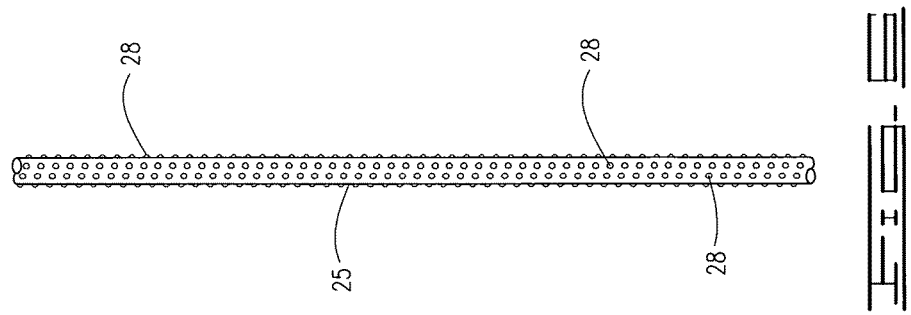
FIG. 6 is an isolated view of the cutting portion of the bowstring saw in a third embodiment having a plurality of elevated cutting teeth in a pattern around the perimeter and along the length of the bowstring saw.
Figure 5:
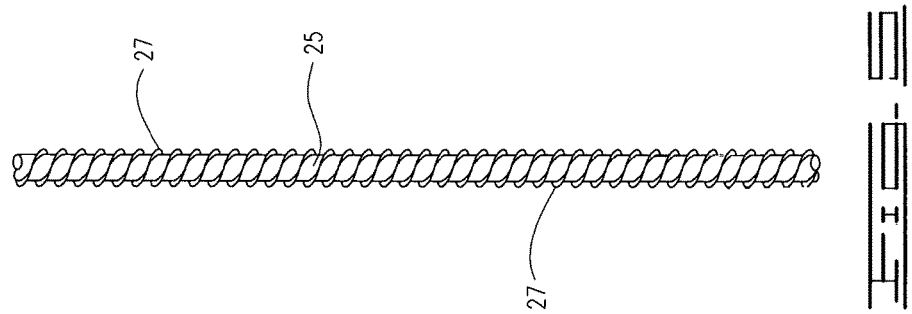
FIG. 5 is an isolated view of the cutting portion of the bowstring saw in a second embodiment having an axially spiraled elevated cutting ridge.
Figure 4:
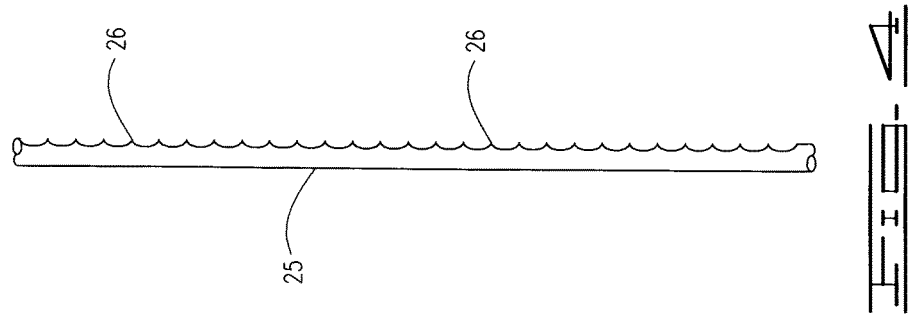
FIG. 4 is an isolated view of the cutting portion of the bowstring saw in a first embodiment having serrated saw teeth.

The cutting width and grit of the cutting portion 25 may vary, depending upon the material being cut and well as the course nature of the cut, wherein a fine cutting margin is presented or a coarse cut can be made for large limbs, branches or firewood stock. Variations of the cutting portion of the bowstring saw include a first embodiment, FIG. 4, which provides for the cutting portion 25 with a plurality of spaced serrated sharp teeth 26 of uniform or varying heights. A second embodiment may incorporate a continuous axially spiraled elevated cutting ridge 27, as indicated in FIG. 5. Additionally, the cutting portion bowstring saw may incorporate a cable 20 with plurality of elevated cutting teeth 28 in a pattern around the perimeter and along the length of the bowstring saw 10 as seen in FIG. 6. There are many more cutting embodiments which can be either manufactured within the modified bowstring saw 10 or incorporated into the basic string by adhesive or other means of integration. The modified bowstring saw 10 may be made from several chosen materials including metal cable, dacron, liquid crystal polymers such as KEVLAR or VACTRAN, and ultra high-molecular-weight polymers including SPECTRA or DYNEEMA, although the string may also be made of more traditional materials including hemp, linen, sinew, silk or rawhide.

The bowstring protective sleeve 30 would be made from additional thread wrapped around the string 20 below or above each upper and lower end loop 22, 24, the thread comprising rubber, fiber wrap, wire wrap, heavy tape, or a polymeric resin compound, the bowstring protective sleeve 30 having a diameter greater than the cutting section of the modified bowstring saw 10, the greater diameter meant to resist being drawn into the saw groove of the material being cut with the modified bowstring saw 10.

Other modification may be made to the modified bowstring saw 10 as contemplated within the scope of the invention, including the modified bowstring saw 10 being presented in components, including the upper and lower loop having removable connections between each loop and the primary string or cable with replaceable cutting sections, reversible cutting sections, multiple cutting surfaces on a single cutting section, modified loop sections incorporating expanded portions further having removable connections for the cutting sections, and other modifications which make the modified bowstring defining other contemplated uses and methods of use. Although the embodiments of the bowstring saw 10 have been described and shown above, it will be appreciated by those skilled in the art that numerous modifications may be made therein without departing from the scope of the invention as herein described.

I claim:

1. A modified bowstring saw conforming to a hunting bow by replacing bowstring used to compel an arrow, said modified bowstring saw comprising:

a rigid and non-stretchable string defining an upper end loop, a lower end loop, and a cutting portion between said upper and lower end loop, each said upper and lower end loop respectively attaching to a nock at respective ends of said bow in same manner as said bowstring used to compel an arrow, wherein said cutting portion is used to saw wood, bone or large game flesh once said bowstring is replaced by said modified bowstring saw.

2. The modified bowstring saw of claim 1, further comprising:

a pair of bowstring protective sleeves integrating upon said modified bowstring string saw respectively and adjacent to each of said upper and lower end loops to restrict any cutting action away from each of said ends of said bow which could result in damage to said bow and said upper and lower end loops of said modified bowstring saw, each of said pair of bowstring protective sleeves having a diameter greater than said string and said cutting section of said modified bowstring saw, said greater diameter meant to resist being drawn into a saw groove of a material being cut by said modified bowstring saw.

3. The modified bowstring saw of claim 1, further comprising:

a pair of loop attachment endpieces between each of said upper and lower end loops of said modified bowstring saw and said respective ends of said bow, each of said loop attachment endpieces defining a first end loop attached to said nock of said bow and a second end loop attached to said respective upper or lower end loop of said modified bowstring saw by a hook, wherein each of said loop attachment endpieces remain on said bow while said modified bowstring saw may be exchanged with a variety of various modified bowstring saws having a variety of cutting portions intended for a variety of cutting purposes.

4. The modified bowstring saw of claim 1, further comprising:

a pair of bowstring protective sleeves affixed upon said modified bowstring string saw adjacent to each of said upper and lower end loops to restrict any cutting action away from each of said ends of said bow which could result in damage to said bow and said upper and lower end loops of said modified bowstring saw, each of said bowstring protective sleeves having a diameter greater than said string and said cutting section of said modified bowstring saw, said greater diameter meant to resist being drawn into a saw groove of a material being cut by said modified bowstring saw; and a pair of loop attachment endpieces between each of said upper and lower end loops of said modified bowstring saw and said respective ends of said bow, each of said loop attachment endpieces defining a first end loop attached to said nock of said bow and a second end loop attached to said respective upper or lower end loop of said modified bowstring saw by a hook, with each of said pair of bowstring protective sleeves incorporated upon each of said pair of loop attachment endpieces between said first and second ends of each of said pair of loop attachment endpieces, wherein each of said loop attachment endpieces remain on each respective said end of said bow while said modified bowstring saw is applied or exchanged with a variety of various modified bowstring saws having a variety of cutting portions intended for a variety of cutting purposes.

5. The modified bowstring saw of claim 1, further comprising:
   said modified bowstring saw is a cable and said cutting portion defines a plurality of integrated and spaced serrated sharp teeth of uniform or varying size and shape extending from said cable.

6. The modified bowstring saw of claim 1, further comprising:
   said modified bowstring saw is a cable and said cutting portion defines a continuous axially spiraled elevated cutting ridge integrated and extending from said cable.

7. The modified bowstring saw of claim 1, further comprising:
   said modified bowstring saw is a cable and said cutting portion defines a plurality of uniformly extending elevated cutting particles integrating with said cable around a length and perimeter of said modified bowstring saw.

\* \* \* \* \*